US009294965B2

(12) United States Patent
Cheng et al.

(10) Patent No.: US 9,294,965 B2
(45) Date of Patent: Mar. 22, 2016

(54) HANDOVER CONTROL SYSTEM, USER TERMINAL, SIGNALING RELAY APPARATUS, AND SESSION CONTROL APPARATUS

(75) Inventors: Hong Cheng, Singapore (SG); Tien Ming Benjamin Koh, Singapore (SG); Xia Li, Singapore (SG); Takako Hori, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 707 days.

(21) Appl. No.: 13/126,581

(22) PCT Filed: Nov. 6, 2009

(86) PCT No.: PCT/JP2009/005913
§ 371 (c)(1),
(2), (4) Date: Apr. 28, 2011

(87) PCT Pub. No.: WO2010/052918
PCT Pub. Date: May 14, 2010

(65) Prior Publication Data
US 2011/0200013 A1 Aug. 18, 2011

(30) Foreign Application Priority Data
Nov. 7, 2008 (JP) .................................. 2008-286994

(51) Int. Cl.
*H04W 4/00* (2009.01)
*H04W 36/00* (2009.01)
*H04W 80/10* (2009.01)

(52) U.S. Cl.
CPC .......... *H04W 36/0011* (2013.01); *H04W 80/10* (2013.01)

(58) Field of Classification Search
CPC .. H04W 28/0226; H04W 80/08; H04W 80/10
USPC .................................................. 370/310–350
See application file for complete search history.

(56) References Cited

U.S. PATENT DOCUMENTS

2006/0198372 A1* 9/2006 Lee ............................... 370/389
2007/0207818 A1 9/2007 Rosenberg et al.
(Continued)

FOREIGN PATENT DOCUMENTS

JP 2004-507948 A 3/2004
JP 2005-064646 A 3/2005
(Continued)

OTHER PUBLICATIONS

Gundavelli, et al; "Proxy Mobile IPv6", Network Working Group, Request for Comments: 5213 Standards Track, pp. 1-93, Aug. 2008.
(Continued)

*Primary Examiner* — Andrew Chriss
*Assistant Examiner* — Kenan Cehic
(74) *Attorney, Agent, or Firm* — Pearne & Gordon LLP

(57) ABSTRACT

The invention discloses a technique to adequately control a handover of a user terminal in a data communication network and to decrease the number of signalings. According to this technique, when address of a user terminal (UE (101)) is not changed after a handover, UE (101) transmits a session update signaling message to carry out update processing of application session to P-CSCF 1 (121) corresponding to a location before the handover via P-CSCF 2 (123) corresponding to a location after the handover. P-CSCF 1 (121) transfers a session update signaling message to S-CSCF/AS (125) by using setup of signaling relating to UE (100) before the handover. At S-CSCF/AS (125), the application session is updated by using registration information of UE (100) before the handover.

6 Claims, 11 Drawing Sheets

(56) References Cited

U.S. PATENT DOCUMENTS

| | | |
|---|---|---|
| 2008/0039081 A1* | 2/2008 | Ma .................... H04L 29/12188 455/433 |
| 2008/0069050 A1 | 3/2008 | Dutta et al. |
| 2009/0067439 A1* | 3/2009 | Yamamoto ............ H04L 63/061 370/400 |
| 2009/0197646 A1* | 8/2009 | Tamura et al. ................. 455/561 |
| 2009/0239531 A1* | 9/2009 | Andreasen et al. ........... 455/433 |
| 2009/0304009 A1* | 12/2009 | Kolhi et al. .................... 370/400 |
| 2010/0027509 A1* | 2/2010 | Velev et al. ..................... 370/331 |
| 2011/0026395 A1* | 2/2011 | Qiu .......................... H04L 1/22 370/217 |
| 2011/0200013 A1* | 8/2011 | Cheng et al. ................... 370/331 |
| 2011/0317666 A1* | 12/2011 | Xia et al. ....................... 370/331 |

FOREIGN PATENT DOCUMENTS

| | | |
|---|---|---|
| JP | 2008-72687 A | 3/2008 |
| WO | 02/19731 A1 | 3/2002 |

OTHER PUBLICATIONS

3GPP et al; "3GPP TS 23.228 V8.6.0"—3rd Generation Partnership Project; Technical Specification Group Services and System Aspects; IP Multimedia Subsystem (IMS); Stage 2 (Release 8), Sep. 2008, pp. 1-241.

3GPP et al; "3GPP TS 24.229 V8.5.1"—3rd Generation Partnership Project; Technical Specification Group Core Network and Terminals; IP multimedia call control protocol based on Session Initiation Protocol (SIP) and Session Description Protocol (SDP); Stage 3 (Release 8) Sep. 2008, pp. 1-559.

3GPP et al; "3GPP TR 23.893 V8.0.0"—3rd Generation Partnership Project; Technical Specification Group Services and Architecture; Feasibility Study on Multimedia Session Continuity; Stage 2 (Release 8) Jun. 2008, pp. 1-241.

International Search Report for PCT/JP2009/005913 dated Feb. 9, 2010.

* cited by examiner

FIG. 10

| Msg Type (10001) |
| --- |
| COMBINE (10003) |
| SEQ (10005) |
| S-CSCF_ID (10007) |
| REG_RESULT (10009) |
| UP_RESULT (10011) |
| Entry_ID (10013) |
| SEC_IE (10015) |
| SDP_IE (10017) |

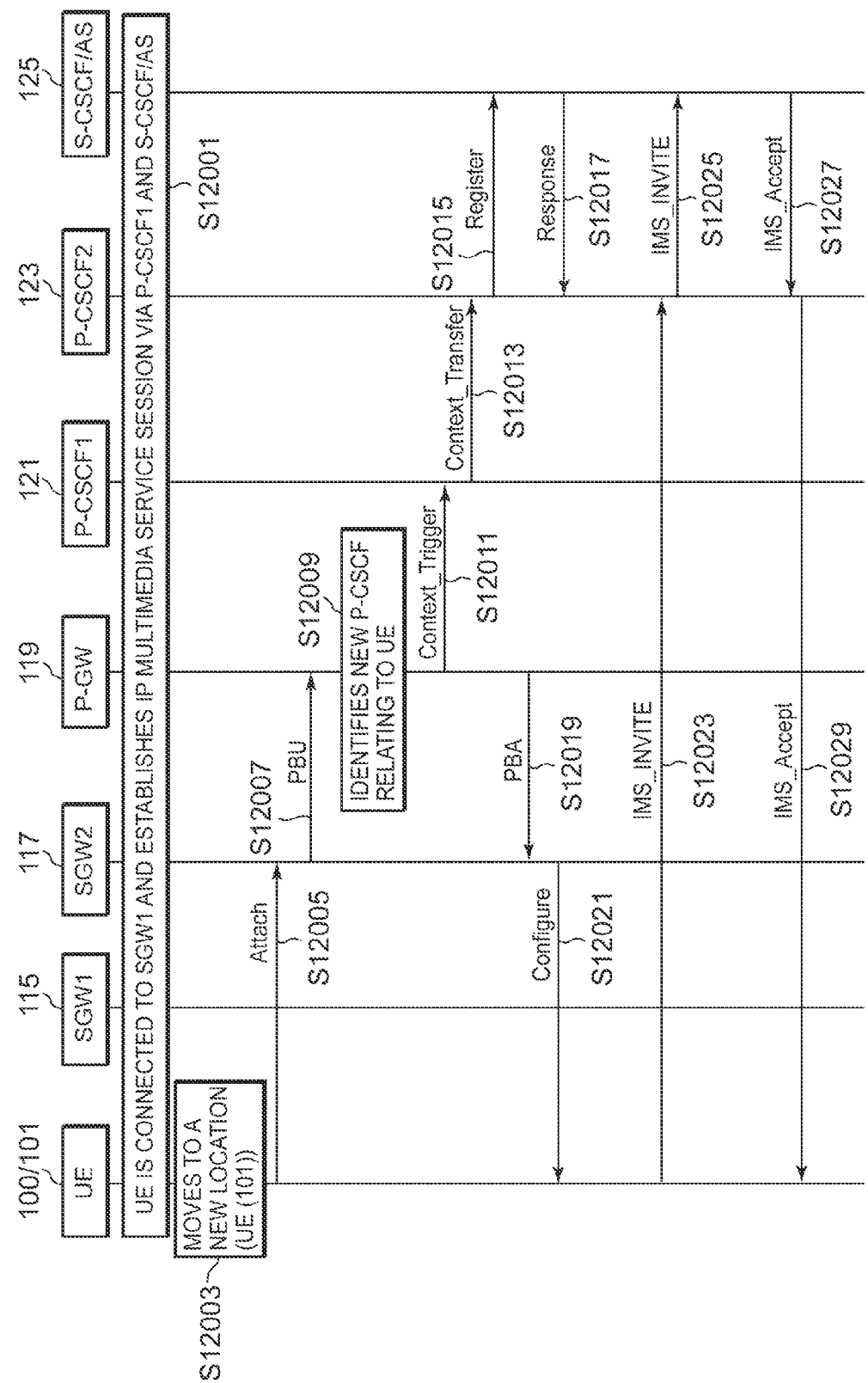

HANDOVER CONTROL SYSTEM, USER TERMINAL, SIGNALING RELAY APPARATUS, AND SESSION CONTROL APPARATUS

TECHNICAL FIELD

The present invention relates to a technology of a data communication network. In particular, the invention relates to a technology of signaling control on a user terminal in a mobile data communication system.

BACKGROUND ART

In most of large-scale networks, a mobility management system by network such as proxy mobile IP (Proxy Mobile Internet Protocol: PMIP; see the Non-Patent Document 1 as given below) is adequately set up. This makes it possible to simplify the arrangement of a user terminal (User Equipment: UE), and operators can perform control more effectively in service behavior. In this type of network, address of the user terminal is not normally changed due to a handover by the user terminal. As a result, mobility can be hidden to an application layer.

On the other hand, as a technique to provide multimedia service by using packet communication network of a cellular phone, IP multimedia subsystem (IMS) is known (see the Non-Patent Document 2 as given below). IMS is a technique, which has been developed to accomplish the Internet Protocol in core network. It is a system, which is useful for integration of voice communication and data communication and to define a system basis to provide various types of services.

PRIOR ART DOCUMENT

Non-Patent Document

[Non-Patent Document 1] Proxy Mobile IPv6; S. Gundavelli et al.: IETF RFC5213; August 2008.
[Non-Patent Document 2] 3GPP TS23.228 V8.6.0; 2008-09.
[Non-Patent Document 3] 3GPP TS24.229 V8.5.1; 2008-09.

However, in the session management using IMS, it is necessary to perform renewal of session each time the signaling path is changed by a handover of the user terminal (e.g. authentication processing or Quality of Service (QoS) control), and signaling must be carried out. Specifically, in case the user terminal performs a handover and the signaling path has been changed, registration processing (authentication processing or signaling path setup processing) must be performed again before call control processing (signaling such as initiation and termination of the session). Therefore, each time the user terminal performs a handover, message exchange must be carried out by two or more times, and delay may occur in the session handover processing. Further, when a multiple of signaling messages are exchanged, more load may be applied to network traffic, or power consumption by the user terminal may be increased.

The same occurs in the case where the mobility management system by the network such as PMIP is used. By the handling of mobility, which is transparent as found in the mobility management system by the networks, disadvantages may be caused to IP-multimedia service where it is necessary to carry out local based control such as the offering of QoS or adaption of signaling. For instance, when the user terminal changes the access network, usable bandwidth may change, or changes may occur in signaling entry point (e.g. Proxy Call Session Control Function (P-CSCF) as defined in the Non-Patent Document 2). However, signaling to update the new network is not triggered because IP address of the user terminal is not changed.

On the other hand, in order to prevent the occurrence of such situation, it may be designed that the signaling is executed each time the user terminal detects re-connection of lower layer. However, the change of the lower layer may not lead to the change of application layer. In such case, unnecessary signaling may occur. Also, even in such case, message exchange must be performed by two or more times to search and establish the signaling path, and this means that delay may be caused in the session handover. Furthermore, when many of these signaling messages are exchanged, more loads may be applied to the network traffic, or power consumption by the user terminal may be increased.

For instance, in the standard procedure, the user terminal must first perform registration at the signaling system before it can carry out the signaling of application layer. In order to maintain security in the signaling, authentication must be made in the registration processing, and this causes further delay.

Referring to FIG. 1 and FIG. 2, more concrete description will be given below on problems in the prior art.

FIG. 1 shows an example of network architecture to explain the prior art. In the subsequent description on the present invention, reference will also be made to the network architecture as shown in FIG. 1. Here, only brief description will be given on the network architecture shown in FIG. 1, and description will be given later on detailed arrangement.

In FIG. 1, a user terminal (UE 100) is first (i.e. before the moving) connected to an access network, which includes an evolved Node B (eNB) 1 (111) and a corresponding Serving Gateway (SGW) 1 (115). Then, UE (100) moves (UE after moving is referred as UE (101)), and it is connected to an access network, which includes eNB 1 (113) and a SGW 2 (117) corresponding to it. SGW 1 (115) and SGW 2 (117) are connected to a core network (135) via a Packet Data Network Gateway (P-GW) (119).

An entry point of control signaling protocol corresponding to an access network including eNB 1 (111) and SGW 1 (115), and an entry point of control signaling protocol corresponding to an access network including eNB 2 (113) and SGW 2 (117) are connected to the access network via P-GW (119) respectively. The entry point has a function to relay control signaling between UE (100) or UE (101) and application control system (e.g. S-CSCF and/or AS (hereinafter referred as S-CSCF/AS (125)) as defined in the Non-Patent Document 2).

FIG. 2 shows an example of sequence of control signaling relating to IP multimedia session according to the prior art.

As shown in Step S2001, UE (100) is connected to SGW 1 (115) at first, and IP multimedia service session is established via P-CSCF 1 (121) and S-CSCF/AS (125). It is assumed here that UE (100) has moved to a new location (the location of UE (101) in FIG. 1) in Step S2003. In Step S2005, UE (101) acquires the same address as the address currently in use by the mobility management system of the network. That is, UE (101) is connected to SGW 2 (117) and acquires the same IP address from the same P-GW (119) via the network based mobility management.

In case it is so arranged that UE (101) triggers the signaling of application by using lower layer information, UE (101) attempts to carry out P-CSCF search processing in Step S2007 and discovers P-CSCF 2 (123), which corresponds to this new location. This processing may be DNS query or may be DHCP query.

Because a different P-CSCF address (i.e. not the address of P-CSCF 1 (121) as used at UE (100), but the address of P-CSCF 2 (123)) as the result of P-CSCF search processing is acquired, UE (101) initiates the registration processing as defined in the Non-Patent Document 2. Specifically, UE (101) transmits an IMS_Register message to the new P-CSCF 2 (123) in Step S2009.

When the IMS_Register message is received, P-CSCF 2 (123) initiates search processing on an adequate S-CSCF for UE (101) as shown in Step S2011, and identifies S-CSCF adequate for UE (101) (i.e. S-CSCF/AS (125)). Then, after carrying out necessary processing as defined in the Non-Patent Document 2, the IMS_Register message is transferred to S-CSCF/AS (125) in Step S2013.

In this case, if security is needed for the control signaling, authentication processing is carried out. This authentication processing is started as defined in the Non-Patent Document 3 given above when S-CSCF/AS (125) sends back a 401 message (Unauthorized: a message to notify that authentication is needed) to UE (101). Although it depends on the authentication system in use, messages are exchanged reciprocally by two or more times in the authentication processing in Step S2015.

When authentication has been successfully performed, S-CSCF/AS (125) checks user profile in Step S2017, and performs service control such as recording of user information to the database or registration to an arbitrary event. Then, S-CSCF/AS (125) sends back an IMS_Accept message to UE (101) in Step S2019, and the IMS_Accept message is transferred to UE (101) via P-CSCF 2 (123).

Only in case the registration has been successfully completed, UE (101) initiates signaling to update the session by sending an IMS_INVITE message via P-CSCF 2 (123) and S-CSCF/AS (125) to the other end of the communication session (e.g. CN) as shown in Step S2023 and S-CSCF/AS (125) and processes the message by updating a remote access leg, for instance, as shown in Steps S2027 and 2029, and a response is given back to UE (101) by the IMS_Accept message.

As given in the description above, the signaling processing is a major processing for registration and authentication to be performed before the processing to update the session (i.e. the processings in Steps S2023 to S2029). Because long time is required for signaling processing of the registration and the authentication (i.e. the processing in Steps S2007 to S2021), delay may be caused in the session update after the handover. Further, these signaling messages relating to the signaling process of the registration and the authentication may apply more loads on the network traffic or power consumption at UE (101) may be increased.

Further, P-CSCF 2 (123) discovered in Step S2007 is merely a P-CSCF corresponding to a new location of UE (101). In fact, there may be possibilities that it may not be the optimal P-CSCF to continuously deal with the session of UE (101). For instance, there are the following cases: a case where it would be better that P-CSCF 1 may be used as it is or a case where the other P-CSCF must be used because of the reason such as management. In such cases, S-CSCF/AS (125) may refuse the registration in Step S2021, and consequently, UE (101) must perform the registration processing again. This means that more signaling message must be transmitted and received, and longer time will be required until the session will be updated.

SUMMARY OF THE INVENTION

To solve the problems as described above, it is an object of the invention to adequately control a handover of a user terminal in a data communication network and to decrease the number of signalings.

To attain the above object, the present invention provides a handover control system for performing signaling control when the user terminal performs a handover from a first access network to a second access network, wherein said system comprises:

a first entry point of control signaling protocol corresponding to said first access network;

a second entry point of control signaling protocol corresponding to said second access network; and a session control apparatus for carrying out management of application session of said user terminal to be connected to either said first access network or said second access network; and wherein, in case the address said user terminal is not changed when said user terminal performs handover from said first access network to said second access network, said user terminal transmits a session update signaling message for carrying out update of said application session to said first entry point; and said first entry point transfers said session update signaling message to update said application session to said session control apparatus; and wherein, updating of said application session is accordingly carried out by using setup of signaling relating to said user terminal as set before said handover.

By the arrangement as described above, it is possible to adequately control the handover of a user terminal in a data communication network and to decrease the number of signalings.

Also, to attain the above object, the invention provides a user terminal for performing a handover from a first access network to a second access network in a handover control system, said handover control system comprising a first entry point of control signaling protocol corresponding to a first access network, a second entry point of a control signaling protocol corresponding to a second access network, and a session control apparatus for carrying out management of application session of a user terminal connected either to said first access network or to said second access network, said user terminal being so arranged as to:

transmit a session update signaling message to carry out updating of said application session to said first entry point in case the address of said user terminal is not changed when said handover is performed from said first access network to said second access network; and wherein, said first entry point transfers said session update signaling message for carry out updating of said application session to be transferred to said session control apparatus so that update processing of said application session is carried out by using setup of signaling relating to said user terminal as set before said handover.

By the arrangement as described above, it is possible to adequately control the handover of a user terminal in a data communication network and to decrease the number of signalings.

Further, to attain the above object, the present invention provides a signaling relay apparatus for functioning as a first entry point in a handover control system for performing signaling control where a user terminal performs a handover from a first access network to a second access network, said handover control system comprising a first entry point of control signaling protocol corresponding to said first access network, a second entry point of control signaling protocol corresponding to said second access network, and a session control apparatus for carrying out management of application session of said user terminal connected either to said first access network or to said second access network, wherein said signaling relay apparatus is so arranged as to:

receive a session update signaling message to carry out update processing of said application session from said user terminal, in case address of said user terminal is not changed when said user terminal performs said handover from said first access network to said second access network, and transfer said session update signaling message to carry out update processing of said application session to said session control apparatus so that said application session is updated by using setup of signaling relating to said user terminal as set before said handover.

By the arrangement as described above, it is possible to adequately control the handover of a user terminal in a data communication network and to decrease the number of signalings.

Also, to attain the above object, the present invention provides a signaling relay apparatus for functioning as a second entry point in a handover control system for performing signaling control where a user terminal performs a handover from a first access network to a second access network, said handover control system comprising a first entry point of control signaling protocol corresponding to said first access network, a second entry point of control signaling protocol corresponding to said second access network, and a session control apparatus for carrying out management of application session of said user terminal connected either to said first access network or to said second access network, wherein said signaling relay apparatus is so arranged as to:

receive a session update signal message to carry out update processing of said application session to be transmitted to said first entry point from said user terminal, add information necessary for update processing of said application session to said session update signaling message and transfer said session update signaling message with the information to said first entry point; and wherein, said first entry point transfers said session update signaling message to update said application session to said session control apparatus so that said application session is updated by using setup of signal relating to said user terminal as set before said handover.

By the arrangement as described above, it is possible to adequately control the handover of a user terminal in a data communication network and to decrease the number of signalings.

Further, to attain the above object, the present invention provides a session control apparatus in a handover control system for performing signaling control where a user terminal performs a handover from a first access network to a second access network, said handover control system comprising a first entry point of control signaling protocol corresponding to said first access network, a second entry point of control signaling protocol corresponding to said second access network, and said session control apparatus for carrying out management of application session of said user terminal connected either to said first access network or to said second access network, wherein said signaling relay apparatus is so arranged as to:

in case that address of said user terminal is not changed when said user terminal performs said handover from said first access network to said second access network, and further, in case that session update signaling message to update said application session transmitted to said first entry point from said user terminal is transferred from said first entry point, change a signaling path of said application session with said user terminal to a signaling path via said second entry point according to said session update signaling message received from said first entry point, and transmit a response message in response to said session update signaling message to said user terminal via said second entry point so that update processing of said application session is carried out by setup of signaling relating to said user terminal as set before said handover.

By the arrangement as described above, it is possible to adequately control the handover of a user terminal in a data communication network and to decrease the number of signalings.

The present invention has the arrangement as described above, and it provides such advantages that a handover of a user terminal in a data communication network can be adequately controlled, and the number of signalings can be decreased.

BRIEF DESCRIPTION OF THE DRAWINGS

FIG. 10 is a table to show an example of details of an IMS_Accept message in the first embodiment of the invention;

FIG. 12 is a sequence chart to show an example of operation in a second embodiment of the invention.

DESCRIPTION OF EMBODIMENTS

Description will be given below on embodiments of the invention by referring to attached drawings. To facilitate the explanation of the invention in more detail, description may be given below by giving a specific number, time, structure, protocol name and other parameters. However, the specific conditions given in the present specification are used only to facilitate the explanation, and the invention is not limited to the description specified herein.

The First Embodiment

First, description will be given on a first embodiment of the invention.

Figure 1:
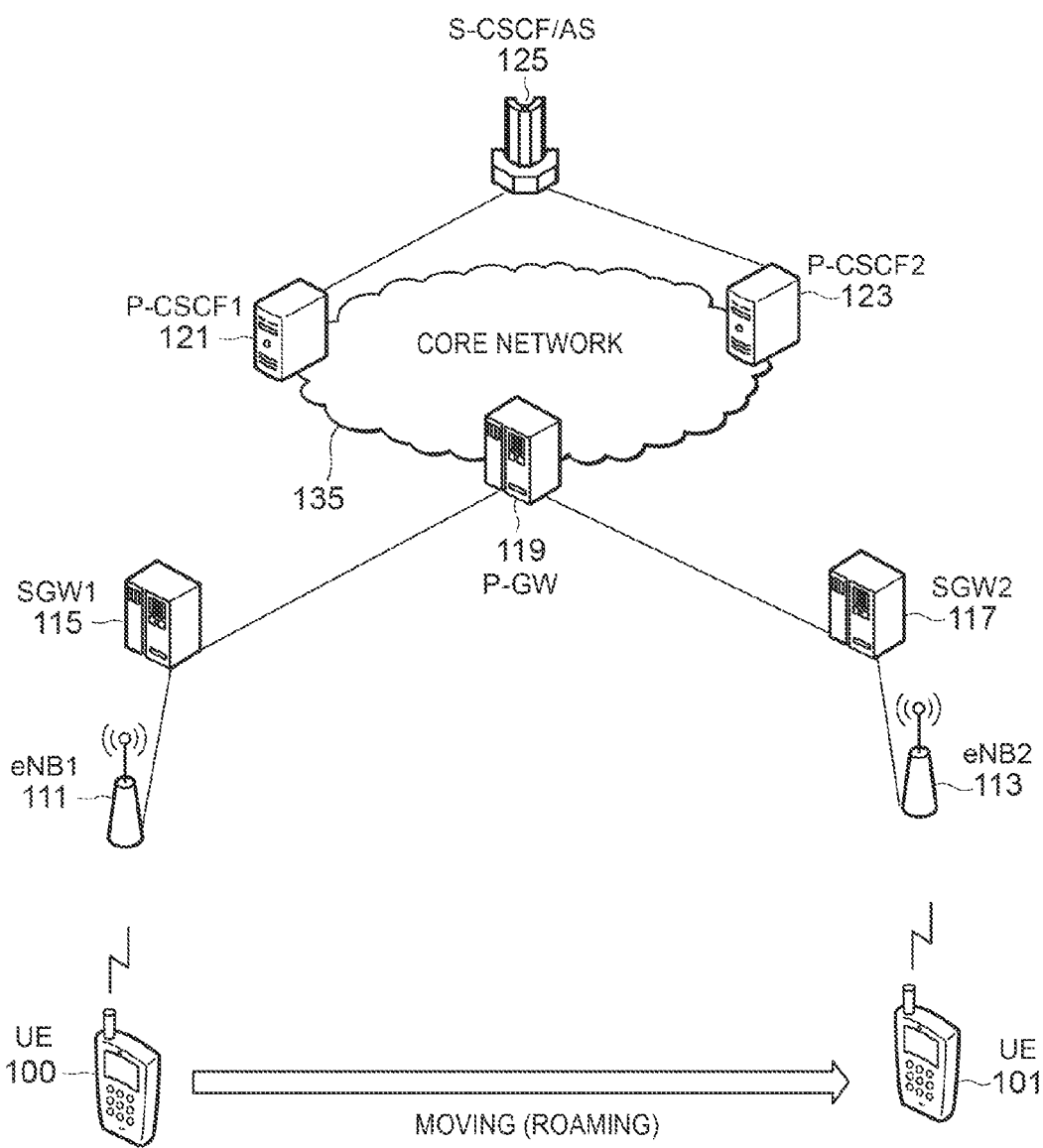
FIG. 1 is a schematical drawing to show an example of network architecture in a first embodiment and a second embodiment of the prior art and of the present invention.

In FIG. 1, an example of network architecture to explain the present invention is shown. As shown in FIG. 1, a user terminal (UE) (100) is connected to an access network including eNB 1 (111) and a SGW 1 (115) corresponding to it. Further, SGW 1 (115) is connected to a core network (135) via P-GW (119).

Also, UE (100) starts an IP multimedia application controlled by an arbitrary control signaling protocol (e.g. SIP) and performs communication to and from a Correspondent Node (CN), which is a communication partner of the UE (100) (not shown).

Further, an entry point (e.g. P-CSCF 1 (121)) of control signaling protocol is connected to an access network via P-GW (119). The entry point has functions to relay control signaling between UE (100) and an application session control system (e.g. S-CSCF and/or AS (described as S-CSCF/AS (125) as defined in the Non-Patent Document 2, for instance).

S-CSCF/AS (125) has the functions to process a signaling message from UE (100) or to relay the message further to another node of communication session (i.e. CN, which is a correspondent partner of UE (100)). The S-CSCF/AS (125) may have other functions such as the functions of a session continuity anchor, for instance.

To simplify the drawing, only a signaling path up to S-CSCF/AS (125) is shown in FIG. 1, while it would be obvious to those skilled in the art that the processing from S-CSCF/AS (125) to the other node of communication session is similar to the processing from S-CSCF/AS (125) to S-CSCF/AS (125). Specifically, UE (100) carries out an initiating processing, and S-CSCF/AS carries out a terminating processing. Also, it would be obvious to those skilled in the art that the processing after S-CSCF/AS (125) (i.e. the processing between S-CSCF/AS (125) and the other nodes of communication session) does not depend on the basic concept of the present invention.

UE (100) has radio communication function and can move to a new location at an arbitrary timing and to be connected to a new eNB. In FIG. 1, UE at a new location after moving (after a handover) is represented by UE (101), and it is shown that UE (101) is connected to another access network including a new eNB 2 (113) and SGW 2 (117) corresponding to it. The access network including SGW 2 (117) is connected to a core network (135) via the same P-GW (119). Also, similarly to the case of SGW 1 (115), SGW 2 (117) is connected to a core network (135) via P-GW (119).

At this new location, a control signaling entry point corresponding to UE (101) is different from the status of UE (100) (the status before moving). That is, the control signaling entry point at a new location after moving is P-CSCF 2 (123). P-CSCF 2 (123) has the function to relay a signaling message between UE (101) and S-CSCF/AS (125). Also, P-CSCF 2 (123) is connected to P-CSCF 1 (121) via a core network (135).

The connection between P-CSCF 1 (121) and P-CSCF (123) may be given in a different format (e.g. via direct connection, via IP network, or via an arbitrary proxy such as S-CSCF/AS (125)). As long as P-CSCF 2 (123) can transfer a signaling message to P-CSCF 1 (121) by using address information provided from UE (101), the basic concept of the present invention is not impacted.

Between SGW 1 (115) and P-GW (119), a mobility management system by new networks such as General Packet Radio Service (GPRS) tunneling protocol (GTP): GPRS tunneling Protocol) or PMIP is used. Also, between SGW 2 (117) and P-GW (119), a mobility management system by the network is adopted, but it is not necessary that these are based on the same protocol. For instance, SGW 1 (115) may use GTP, and SGW 2 (117) may use PMIP. The mobility management system to be used in access network does not exert influence on the basic concept of the present invention so far as IP address of UE (100/101) is not changed after the handover.

In FIG. 1, only the network nodes relating to the signaling according to the present invention are shown, while it would be obvious to those skilled in the art that more types of nodes (not shown) may be involved in communication processing such as Domain Name System (DNS) server, Dynamic Host Configuration Protocol (DHCP) server, Mobility Management Entity (MME), etc.

FIG. 1 shows the condition where P-CSCF 1 (121) and P-CSCF 2 (123) are connected to UE via P-GW (119). In actual arrangement, however, P-CSCF 1 (121) and P-CSCF 2 (123) may be disposed in the access network. For instance, these may be disposed in the same apparatus as that of SGW 1 (115) or SGW 2 (117). So far as P-CSCF 1 (121) and P-CSCF 2 (123) would be able to perform communication with each other directly or indirectly (i.e. via an arbitrary other proxy), no substantial influence will be exerted on the basic concept of the invention.

Figure 2:
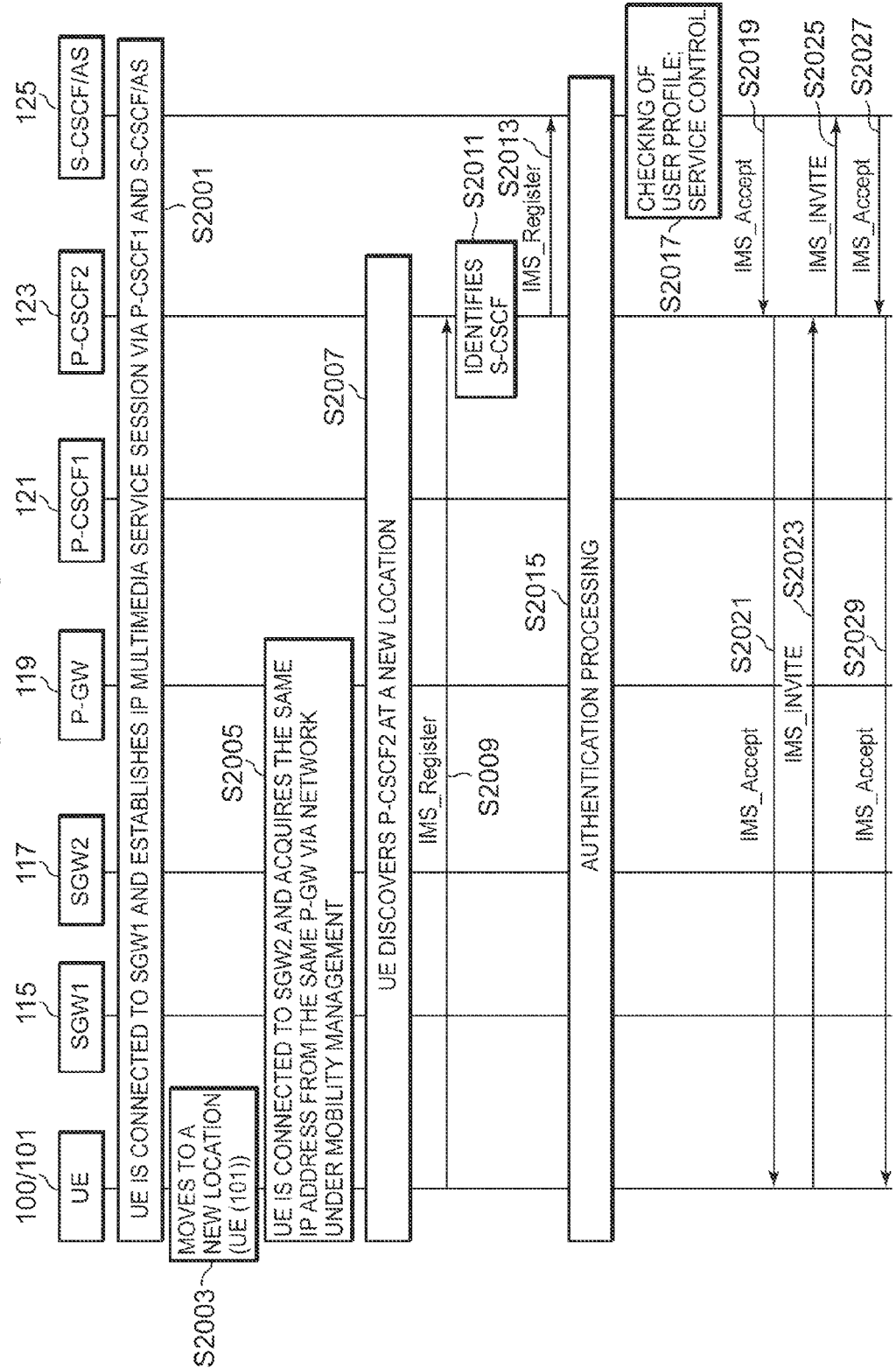
FIG. 2 is a sequence chart to show an example of control signaling relating to IP multimedia session based on the processing as defined in the prior art.
Figure 3:
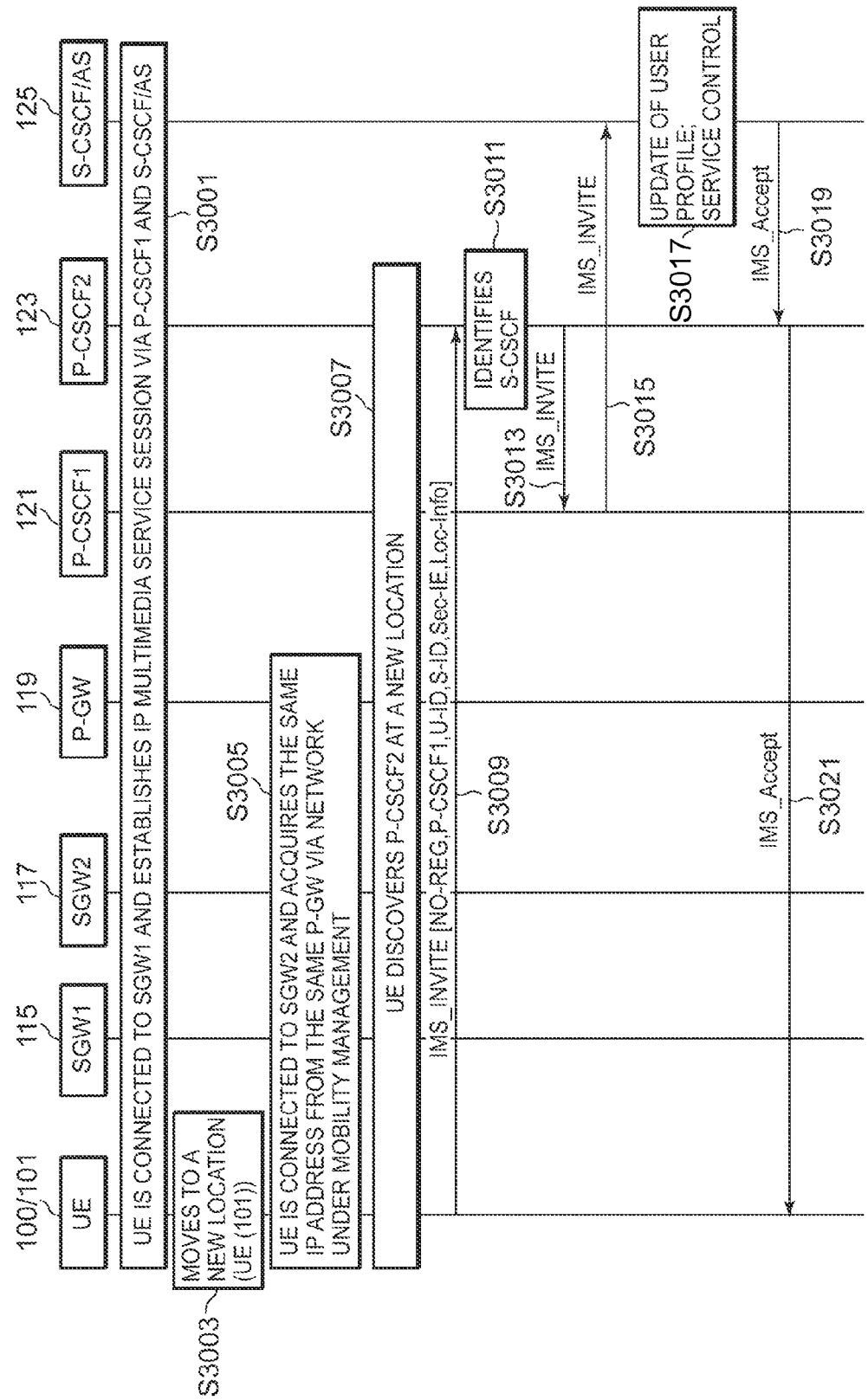
FIG. 3 is a sequence chart to show an example of operation in a first embodiment of the invention.

FIG. 3 shows an example of operation in the first embodiment of the invention. As it is evident when this is compared with the sequence relating to the prior art as shown in FIG. 2, signaling is decreased in the sequence of the present invention shown in FIG. 3.

As it is seen in Step S3001, UE (100) is first connected to SGW 1 (115), and IP multimedia service session is established via P-CSCF 1 (121) and S-CSCF/AS (125). It is assumed here that UE (100) moves to a new location (a location of UE (101) in FIG. 1) in Step S3003. In Step S3005, UE (101) acquires the same address as the address currently in use according to the mobility management system by the network. This means that UE (101) is connected to SGW 2 (117) and acquires the same IP address (i.e. the address before the handover) from the same P-GW (119) via the network under the mobility management. The processings of Steps S3001 to S3005 as shown in FIG. 3 may be the same as the processings in S2001 to S2005 shown in FIG. 2.

In the present invention, the address of UE (101) is the same as that of UE (100) before the handover. Thus, when UE (101) moves to a new location, it is utilized that the signaling path (signaling connection) used before the handover can be used again.

During the connection processing, UE (101) discovers a signaling entry point corresponding to this new location (e.g. P-CSCF (123)) and acquires the address of this P-CSCF 2 (123). The acquisition of the address of P-CSCF 2 (123) may be performed in a part of Access Network Detection and Selection Function (AND SF) processing. For instance, this processing may be a part of query based on the IEEE (The Institute of Electrical and Electronic Engineers) 802.11, or it may be configuration push of network base according to Open Mobile Alliance Device Management System (OMA-DM system). When the access network has GPRS interchangeability, the address of P-CSCF 2 (123) can be embedded in a bearer setup processing as defined in the Non-Patent Document 2. In case the system as described above cannot be used, UE (101) may use an IP-based searching mechanism such as DNS, DHCP, etc. It would be obvious to those skilled in the art that the mechanism used to acquire the address of P-CSCF 2 (123) does not exert influence on the basic concept of the present invention.

After acquiring the address or the identification information of P-CSCF 2 (123), UE (101) compares these with the address or the identification information of P-CSCF before the handover kept in memory (i.e. P-CSCF 1 (121)). In case the address or the identification information has been changed (i.e. P-CSCF is different between before and after the moving), UE (101) carries out special signaling processing.

Instead of carrying out the registration signaling processing (i.e. registration and authentication processing), UE (101) transmits a normal session signaling message (e.g. an IMS_INVITE message to P-CSCF 2 (123) as shown in Step S3009. In case of 3GPP access, the IMS_INVITE message is turned to an INVITE message as defined in the Non-Patent Documents 2 and 3.

Because the registration processing is not carried out, the IMS_INVITE message as transmitted in Step S3009 is sent to an open port of P-CSCF 2 (123). That is, there is no need that the connection is made in advance. UE (101) acquires port information as a part of address information of P-CSCF 2 included in a DHCP query response—for instance, during the searching of P-CSCF 2 (123). In case the port information is not explicitly provided to UE (101), UE (101) uses any predefined port (e.g. the open port as defined in the Non-Patent Document 3).

Several additional flags or information elements may be included in the IMS_INVITE message to be transmitted in Step S3009. In the following, a list is given on examples of additional flags and information elements, which are included in the IMS_INVITE messages to be transmitted in Step 3009.

A flag, which instructs that the IMS_INVITE message should be transmitted first without making registration at a new location.

A special sequence to be used for the matching of responses.

An index that UE (101) recognizes a system to select P-CSCF different from the present P-CSCF (e.g. P-CSCF 2 (123)).

Information element relating to P-CSCF before the handover (including address and port number, for instance).

User identification information of UE (101) registered at P-CSCF before the handover.

Identification information of instance or session of the user at UE (101).

Security information element and information to be used to carry out new registration in order that P-CSCF before the handover can authenticate the message.

Local information element to be used by UE (101) in order to update IP multimedia session (e.g. parameters of new set relating to media).

Information elements of application session including application session control parameters relating to the session update. This part of the message can be encrypted by using security association between UE (101) and P-CSCF 1 (121).

When P-CSCF2 (123) receives the IMS_INVITE message transmitted in Step S3009, it recognizes from the flag that this message is to be transmitted without carrying out the registration processing. In this case, P-CSCF 2 (123) reads out the information of P-CSCF before the handover (i.e. P-CSCF 1 (121)) from the corresponding information element. Next, P-CSCF 2 (123) carried out the preparation to issue the IMS_INVITE message to P-CSCF 1 (121) according to the address information as acquired from the message.

Also, P-CSCF 2 (123) updates local information element based on the received IMS_INVITE message in Step S3011. For instance, P-CSCF 2 (123) adds address information of its own, local access network information, local access information of UE (101), and others to the local information element.

Further, P-CSCF 2 (123) may carry out updating of security information element when necessary. For instance, P-CSCF 2 (123) may establish further security association by storing the security information as provided from UE (101) at an arbitrary position (e.g. nonce value). Also, P-CSCF 2 (123) may insert additional security vector to authenticate P-CSCF 2 (123) to the information elements.

After these processes of updating, P-CSCF 2 (123) transfers the IMS_INVITE message to P-CSCF 1 (121) by using the address given by UE (101) in Step S3013. P-CSCF 2 (123) may transmit the message by re-using an arbitrary relation already existing between P-CSCF 1 (121) and P-CSCF 2 (123). P-CSCF 2 (123) can use a special port of P-CSCF 1 (121) to receive the IMS_INVITE message by P-CSCF 1 (121) without confirming whether or not the transmission source address of the IMS_INVITE message transmitted in Step S3013 is consistent with the address that is finally registered by the user.

When P-CSCF 1 (121) finds out a flag, which indicates that registration is not performed in the IMS_INVITE message as transmitted in Step S3013, it carries out the processing similar to the normal processing as if this IMS_INVITE message has been directly received from UE (101). However, when this IMS_INVITE message is to be updated, P-CSCF 1 (121) does not overwrite information added by P-CSCF 2 (123) (e.g. the address of P-CSCF 2 (123) in local information element or security vector). Also, P-CSCF 1 (121) confirms from the array of addresses in Record-Route header that information added by P-CSCF 2 (123) is present in the order as indicated, and that the P-CSCF 2 (123) is the P-CSCF, which is the closest to UE (101).

For instance, after carrying out the necessary processing as defined in the Non-Patent Document 2, P-CSCF 1 (121) transfers the IMS_INVITE message to S-CSCF/AS (125) according to the record relating to the user and the session. When the IMS_INVITE message as transmitted in Step S3015 is received, it is estimated that this IMS_INVITE message is not only a normal session update message but also a message for the updating of the registration from the flag, which indicates that the registration is not carried out.

In this case, S-CSCF/AS (125) performs updating and service control of user profile similarly to the case when a normal INVITE message is received as shown in Step S3017. For instance, in this processing, refreshing of timer and updating of remote access leg of the session are carried out. At the same time, S-CSCF/AS (125) retrieves P-CSCF 2 (123) as inserted in this IMS_INVITE message.

The updating of the registration is performed according to the information offered primarily from P-CSCF 2 (123). For instance, the processing to store the address or the identification information of P-CSCF 2 (123) at S-CSCF/AS (125), or temporary ID allotment, new temporary ID allotment to UE (101), or updating of security association are carried out. For instance, S-CSCF/AS (125) may assign new T-GRUU (Temporary Globally Routable UA URI) to UE (101).

After carrying out the session updating and the registration processing, S-CSCF/AS (125) sends a response to UE (101) by an IMS_Accept message as shown in Step S3019. After the registration processing has been carried out, the IMS_Accept message to be sent in Step S3019 is transferred—not via P-CSCF 1 (121) but via P-CSCF 2 (123) because the address of P-CSCF 2 (123) is stored at S-CSCF/AS (125) after the registration processing has been carried out.

In the IMS_Accept message, two parameter sets (i.e. the one for session update and the one for the registration) are included. Also, two sets of result codes may be present for these two processings. S-CSCF/AS (125) may place additional parameters such as a Session Description Protocol (SDP) object with regard to the session update in the response. Further, S-CSCF/AS (125) may place any arbitrary security object of keying materials relating to P-CSCF 2 (123) with regard to the registration processing in the response.

S-CSCF/AS (125) must include a special sequence value in the IMS_INVITE message in the response (i.e. the IMS_Accept message to be transmitted in Step S3019). For instance, the following examples may be included as information inserted in the IMS_Accept message to be transmitted in Step S3019.

A flag to indicate that this message is a response to each of the session update and the registration update.

A special sequence value for the matching of response to the request by UE (101) and to be copied from the IMS_INVITE message as transmitted in Step S3015.

Address of S-CSCF/AS (125) or information element of identification information.

Result code relating to session update processing.

Result code relating to registration update processing.

P-CSCF identification information element to indicate P-CSCF as selected by S-CSCF/AS (125) in order to continue the session.

Security vector to establish association with UE (101) by P-CSCF 2 (123).

SDP object to describe session control parameters.

After receiving the IMS_Accept message in Step S3019, P-CSCF 2 (123) checks P-CSCF identification information elements in the IMS_Accept message, and in case these are consistent with the identification information of its own, the address information of its own to be used in further communication (e.g. IP address, port number, corresponding encryption algorithm, etc.) in the IMS_Accept message to be transferred to UE (101).

In case no record relating to UE (101) is present, P-CSCF (123) stores necessary information by preparing the record relating to UE (101) (e.g. stores the address of S-CSCF/AS (125)), and generates the key for subsequent communication to and from UE on the registration as defined in the Non-Patent Document 2.

Further, P-CSCF 2 (123) deletes any information unnecessary to UE (101) (e.g. instruction of charging or security vector). In Step S3021, the IMS_Accept message changed is thus transferred to UE (101). If necessary, P-CSCF 2 (123) may use security protection to the IMS_Accept message to be transmitted to UE (101).

When the IMS_Accept message is received in Step S3021, UE (101) carries out matching and reading of the IMS_INVITE message transmitted in Step 3009 according to the sequence value. If security protection can be used, UE (101) verifies the message by using security information associated in the status and generates a key, which is needed in the subsequent communication. Further, UE (101) stores address information (such as IP address, port number, etc.) of P-CSCF 2 (123) embedded in the IMS_Accept message transmitted in Step S3021. At the same time, UE (101) performs updating of application arrangement by using SDP information in the IMS_Accept message transmitted in Step 3021.

Figure 4:
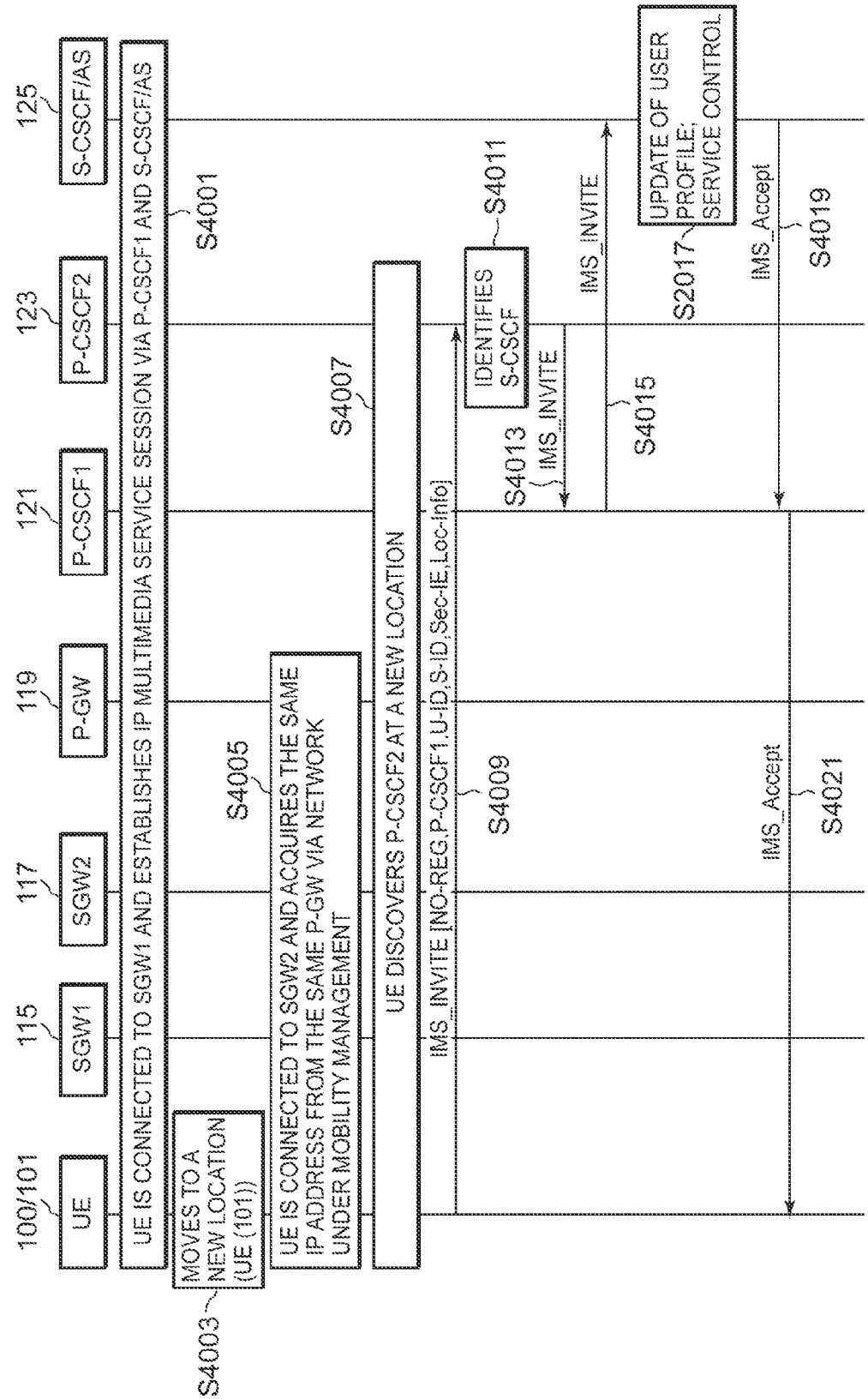
FIG. 4 is a sequence chart to show another example of operation in the first embodiment of the invention.

FIG. 4 shows another example of operation in the first embodiment of the invention. In FIG. 4, the processing in Steps S4001 to S4015 are the same as the processing in Steps S3001 to S3015 in FIG. 3.

In Step S4017, after receiving the IMS_INVITE message including indices, by which UE (101) can recognize the system to select a new P-CSCF (i.e. the IMS_INVITE message of Step S4015), S-CSCF/AS (125) performs evaluation of two or more P-CSCF's, which can be used, according to local information elements in the IMS_INVITE message transmitted from P-CSCF 2 (123) (e.g. local access network information).

For instance, even when it is after UE has performed a handover, it is assumed here that S-CSCF/AS (125) has judged P-CSCF 1 (121) as suitable for the support of the continuity of the session. In this case, S-CSCF/AS (125) executes registration update with regard to P-CSCF 1 (121), which was judged as more appropriate (e.g. the refreshing of the corresponding timer).

The conditions as given below can be cited as examples which S-CSCF/AS (125) can use as the standards to judge on appropriate P-CSCF for UE (101). For instance, one or more of the conditions given below will be selected according to the policy as set by the user and/or by the operator.

Loading conditions of P-CSCF (such as load balancing).

Geographical location of UE.

Version number of software/signaling stack.

The type of the subscribed service (e.g. P-CSCF for exclusive use of premium service).

Associated access node (e.g. via Macro-cell or HeNB).

Access type (e.g. CS (Circuit Switched) or PS (Packet Switched)).

The current date.

Agenda of maintenance on operator side.

More detailed user profile/favorite of the user (e.g. age, sex, cost, etc.)

The requirements of continuity of mobility/session, the condition of SCC (Service Centralization and Continuity) server.

After carrying out necessary processing such as registration update, update of remote access leg, update of security association on the IMS_INVITE message, etc., S-CSCF/AS (125) transmits a response message to the selected and the most appropriate P-CSCF (i.e. P-CSCF 1 (121)) as shown in Step S4019.

In the transfer of the IMS_INVITE message in Step S4015, the association already present between S-CSCF/AS (125) and P-CSCF 1 (121) can be used. The format of the IMS_Accept message in Step S4019 is the same as that of the IMS_Accept message transmitted in Step S3019. However, in the IMS_Accept message of Step S4019, identification information of P-CSCF 1 (121) is included in the P-CSCF identification elements.

After receiving the IMS_Accept message transmitted in Step S4019, when P-CSCF 1 (121) comprehends that the identification information contained in this message is consistent with the identification information of its own, P-CSCF 1 (121) updates the corresponding status entry of UE (101) (such as refreshing of the timer, updating of key, etc.).

Then, P-CSCF 1 (121) adds address information (e.g. IP address or port number to be used by UE (101), the protocol used, security system, etc. in the IMS_Accept message to be transferred to UE (101). When status update is carried out, the information (such as keying materials) as read from the IMS_INVITE message received in Step S4009 is used. Further, P-CSCF 1 (121) deletes any arbitrary unnecessary information (such as instruction of the charging, network information, etc.) not needed for UE (101) from the IMS_Accept message.

The IMS_Accept message thus processed is transferred to UE (101) from P-CSCF 1 (121) as shown in Step S4021. When the IMS_Accept message (4021) is received, UE (101) performs matching and reading on the status stored when the IMS_INVITE message (4009) has been transmitted in Step S4009 by using the sequence value. In case security protection can be used, UE (101) verifies the message by using security information associated with this status, and a key is generated, which will be needed for the subsequent communication. Further, UE (101) stores address information (such as IP address, port number, etc.) of P-CSCF 1 (121) to be used in the subsequent communication. At the same time, UE (101) performs updating of application arrangement by using SDP information in the IMS_Accept message transmitted in Step S4021.

Figure 5:
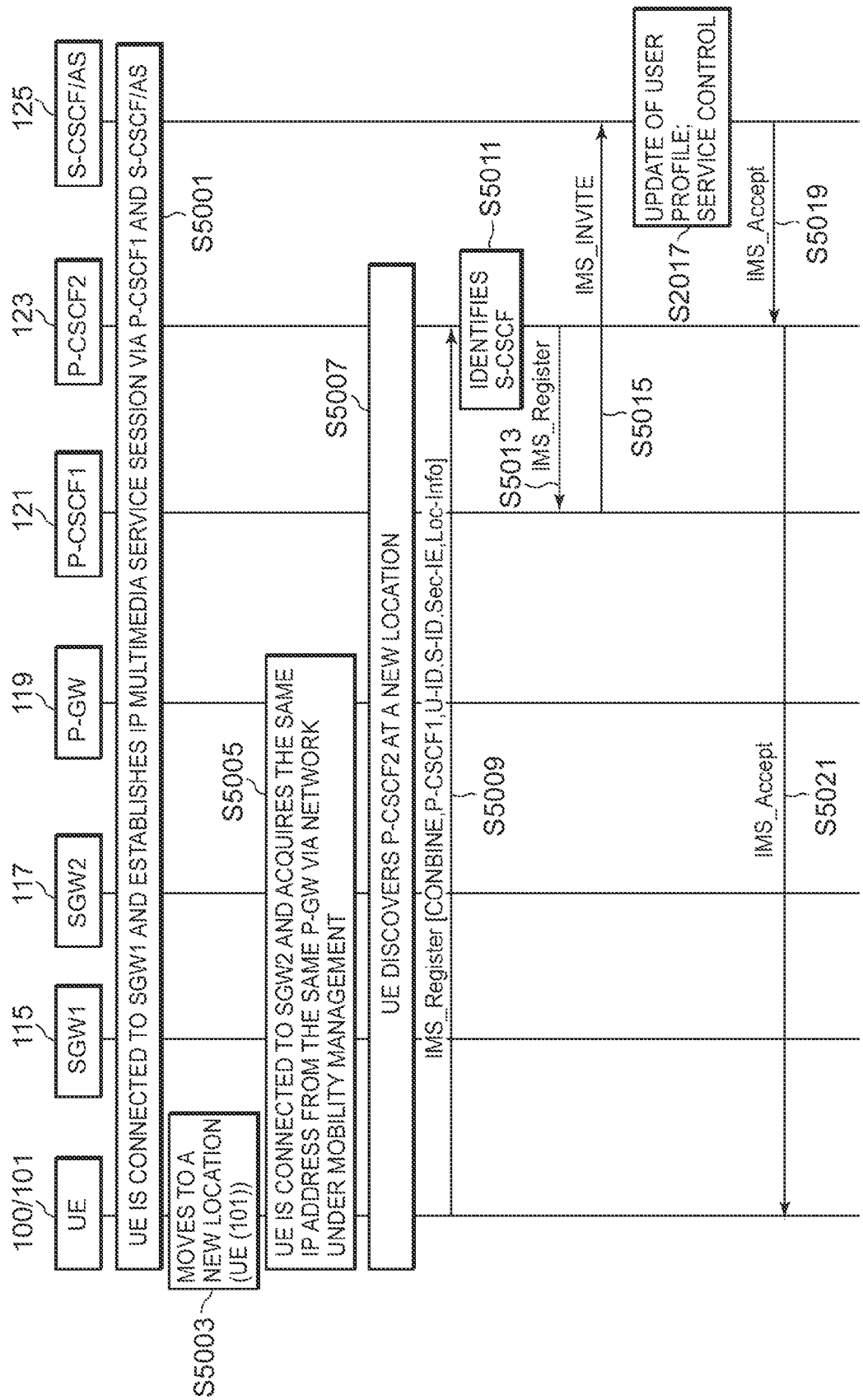
FIG. 5 is a sequence chart to show still another example of operation in the first embodiment of the invention.

FIG. 5 shows still another example of operation of the first embodiment of the invention. In FIG. 5, the processings in Steps S5001 to S5007 are the same as the processings in Steps S3001 to S3007 in FIG. 3.

In Step S5009, UE (101) transmits the IMS_Register message to P-CSCF 2 (123). As seen from the nature of the Register message, UE (101) can transmit this IMS_Register message to the open port of P-CSCF 2 (123). The following are examples of the information to be included in the IMS_Register message (5009):

A flag to indicate that the registration is incorporated in the session update.

A special sequence to be used in the matching of the response.

Indices to indicate that UE (101) can recognize the system to select P-CSCF, which is different from the present P-CSCF 2 (123).

Information element relating to P-CSCF before the handover (e.g. address and port number).

User identification information of UE (100) as registered at P-CSCF before the handover.

Identification information of instance or session of the user at UE (100).

Security information element to carry out authentication of the message by P-CSCF before the handover and information, which is available to carry out new registration.

Local information element to be used for the updating of IP multimedia session by UE (101) such as new parameter set relating to the media.

Local information element to be used for the updating of IP multimedia session by UE (101) (e.g. parameters of the new set relating to the media).

Application session information element including application session control parameters relating to session update. This part of the message can be encrypted by using security association between UE (101) and P-CSCF 1 (121).

When the IMS_Register message transmitted in Step S5009 is received, P-CSCF 2 (123) checks whether a flag to indicate the integration of registration and session update is present or not. If the flag is present, P-CSCF 2 (123) skips the standard S-CSCF search processing (i.e. it skips the registration processing to S-CSCF by P-CSCF 2 (123).

On the other hand, P-CSCF 2 (123) acquires information of P-CSCF before the handover from the IMS_Register message transmitted in Step S5009 and carries out the processing to transfer the message toward the address as designated. In this case, P-CSCF 2 (123) updates local information element as shown in Step S5011. For instance, P-CSCF 2 (123) adds address information of its own, local access network information, local access information of UE (101), etc. to the local information element.

Further, P-CSCF 2 (123) may carry out the updating of the security information elements as necessary. For instance, P-CSCF 2 (123) may store any arbitrary part of the security information as provided from UE (101) (e.g. nonce value), and may establish further security association. Also, P-CSCF 2 (123) may add additional security vector through authentication of P-CSCF 2 (123) by S-CSCF/AS (125) to the information elements.

After these processings of update, P-CSCF 2 (123) transfers the IMS_Register message to P-CSCF 1 (121) by using the address as designated by UE (101) in Step S5013. Because of the nature of the Register message, P-CSCF 1 (123) can transmit this IMS_Register message to the open port of P-CSCF 1 (121).

When the IMS_Register message as transmitted in Step S5013 is received, P-CSCF 1 (121) detects a flag, which indicates the registration and the integration of session update. If the flag is present, P-CSCF 1 (121) checks whether it is possible or not to recognize UE (101) according to identification information of UE (100) as indicated in the IMS_Register message of Step S5013. In case UE (101) can be recognized from the identification information of UE (100), P-CSCF 1 (121) reads out the status of UE (100) by using identification information of UE (100).

Next, P-CSCF 1 (121) specifies the application session information elements in the IMS_Register message in Step S5013, and decryption is performed by using a key associated with the status of UE. Then, P-CSCF 1 (121) carries out the processing of the IMS_Register message of Step S5013 as if this IMS_Register message is a session update message (e.g. IMS_INVITE message). After the session update processing, P-CSCF 1 (121) transfers the message to S-CSCF/AS (125) by using status information of UE (100). This message is transferred as an IMS_INVITE message (i.e. by using the method of the INVITE message).

Message formation of the IMS_INVITE message to be transmitted in Step S5015 is the same as the format of the IMS_INVITE message transmitted in Step S3015 in FIG. 3. Also, operations in Steps S5017 to S5021 are the same as the operations of Steps S3017 to S3021 as shown in FIG. 3. In case S-CSCF/AS 2 (125) judges that P-CSCF 1 (121) is the most appropriate for UE (101) at the new location with regard to the continuity of the session, it would be obvious to those skilled in the art that the processings in Steps S4017 to S4021 can also be applied in this case.

The operations as shown in FIG. 5 are advantageous in that the IMS_Register messages (e.g. the messages in Steps S5009 to S5013) can be transferred to the open port of P-CSCF without requiring the association in advance. At the same time, with regard to important information relating to the session update between UE (101) and P-CSCF 1 (121), protection can be made by using security association already existing.

Figure 6:
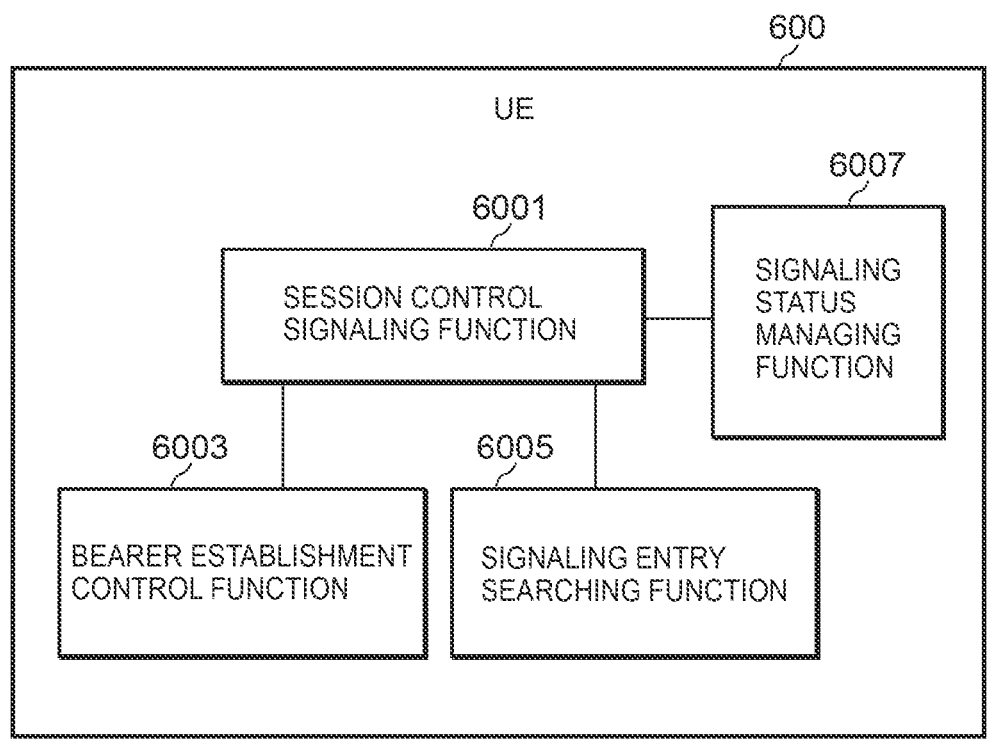
FIG. 6 is a schematical drawing to show an example of an arrangement of a UE (user equipment; user terminal) in the first embodiment of the invention.

FIG. 6 shows an example of arrangement of UE in the first embodiment of the invention (corresponding to UE (100) and UE (101) in FIG. 1 respectively). As shown in FIG. 6, UE (600) has four major functions: session control signaling function (6001), bearer establishing control function (6003), signaling entry searching function (6005), and signaling status management function (6007). UE (600) may be provided with other functions.

Among the functions of UE (600), the session control signaling function (6001) is a function to prepare and process the signaling message. The session control signaling function (6001) is a function to receive and process, for instance, the IMS_INVITE messages (the IMS_INVITE messages to be transmitted in Steps S3009 and S4009), transmitting of the IMS_Register messages (the IMS_Register messages to be transmitted in Step S5009), and the IMS_Accept messages (the IMS_Accept messages to be transmitted in Steps S3021, S4021 and S5021).

The session control signaling function (6001) is also the function to make decision on operation mode. The session control signaling function (6001) is also the function to decide whether the sequences as shown in FIG. 3, FIG. 4, and FIG. 5 are to be carried out or not. This decision is made according to a network policy provided by the method such as OMA-DM, etc., policy arrangement as set up in advance at UE (600) or according to the network arrangement information as acquired via ANDSF, or according to the network policy provided by OMA-DM. For instance, when P-CSCF at the new location (e.g. P-CSCF (123)) is so arranged that the INVITE message can be listened at the open port, it is possible to carry out the sequences of FIG. 3 and FIG. 4, and the IMS_INVITE message is transmitted in Step S3009 or in Step S4009. In other cases, the sequences as shown in FIG. 5 must be carried out, and the IMS_Register message must be transmitted in Step S5009. The session control signaling function (6001) also includes the function to control application session according to the parameters obtained by the signaling.

The bearer establishing control function (6003) is the function to carry out the processing to establish connection of UE (600) to the network. This processing includes, for instance: PDP (Packet Data Protocol) context setup processing and bearer set in GPRS system, or connection of Wireless LAN and authentication processing. In the setup of the bearer, arrangement processing of IP address of UE (600) may be carried out.

The signaling entry searching function (6005) is the function to carry out the processing, by which UE (600) identifies the location of signaling entry in a local network. In the example as described in the present specification, the signaling entry is a local P-CSCF, but it may be the other node. The signaling entry searching function (6005) may be accomplished as DNS or DHCP client, or as IEEE 802.21 media-independent handover information service, etc.

The signaling entry searching function (6005) can be integrated with the bearer establishing control function (6003) in GPRS system, for instance. When it is possible to identify P-CSCF (e.g. P-CSCF 2 (123)) prior to the bearer signaling by the signaling entry searching function (6005), transmission can be made by sending the first signaling messages from UE (600) (i.e. the IMS_INVITE messages to be transmitted in Step S3009 and S4009) or the IMS_Register (i.e. the IMS_Register message to be transmitted in Step S5009) may be transmitted by the bearer establishing processing (e.g. by NAS (Non Access Stratum) signaling in the access in E-UTRAN (Evolved Universal Terrestrial Radio Access Network)) access.

The signaling status management function (6007) is a function to carry out the processing to store status information relating to the signaling session. For instance, the signaling status management function (6007) stores types of information such as address of signaling entry, security association, refresh timer, etc.

Figure 7:
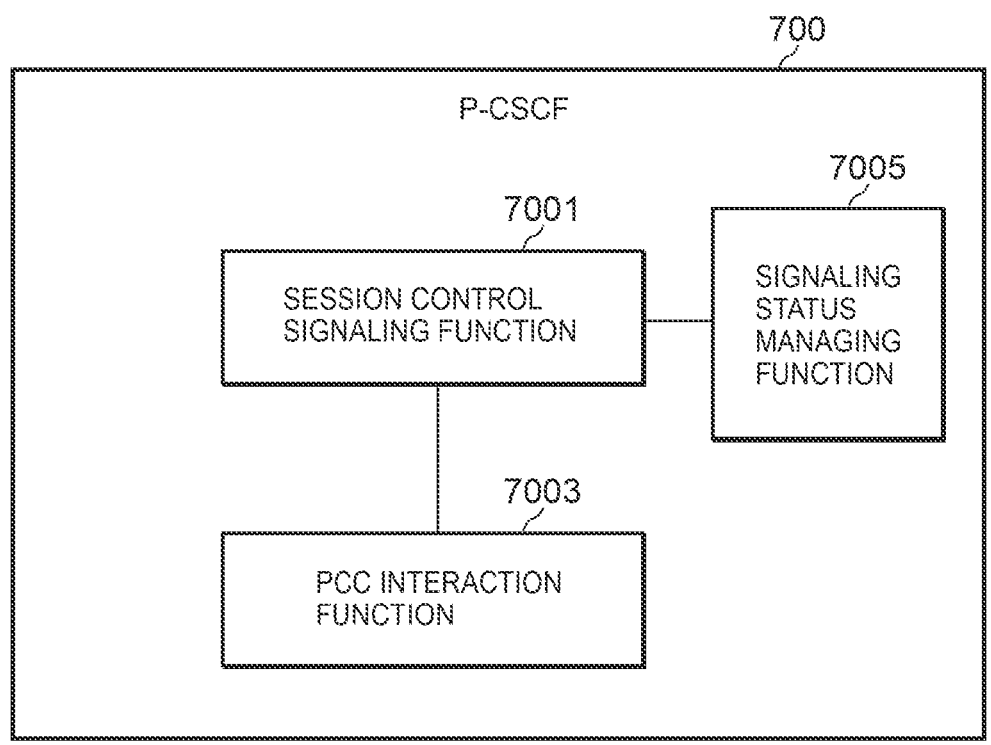
FIG. 7 is a schematical drawing to show an example of an arrangement of P-CSCF in the first embodiment of the invention.

FIG. 7 shows an example of arrangement of P-CSCF (corresponding to P-CSCF 1 (121) and P-CSCF (123) in FIG. 1) in the first embodiment of the invention. P-CSCF (700) has three major functions: session control signaling function (7001), PCC (Path Computation Client) interaction function (7003), and signaling status management function (7005). P-CSCF (700) may be provided with the other functions.

Among the functions of P-CSCF (700), the session control signaling function (7001) is a function to recognize a flag of the IMS_INVITE messages (i.e. the IMS_INVITE messages to be transmitted in Steps S3009 and S4009), and flag processing can be carried out as described above. By the session control signaling function (7001), it is possible to introduce local access network information to the IMS_INVITE message (the IMS_INVITE messages to be transmitted in Steps S3013 and S4013) or the IMS_Register message (i.e. the IMS_Register message to be transmitted in Step S5013).

The PCC interaction function (7003) is a function to carry out interaction for policy control and charging framework in order that the control according to the parameter provided by the signaling can be carried out on the network side. Also, the signaling status management function (7005) is a function to carry out the processings of preparation and storage of the session status entry relating to UE (100) or UE (101) (e.g. S-CSCF information, security key information, etc.).

Figure 8:
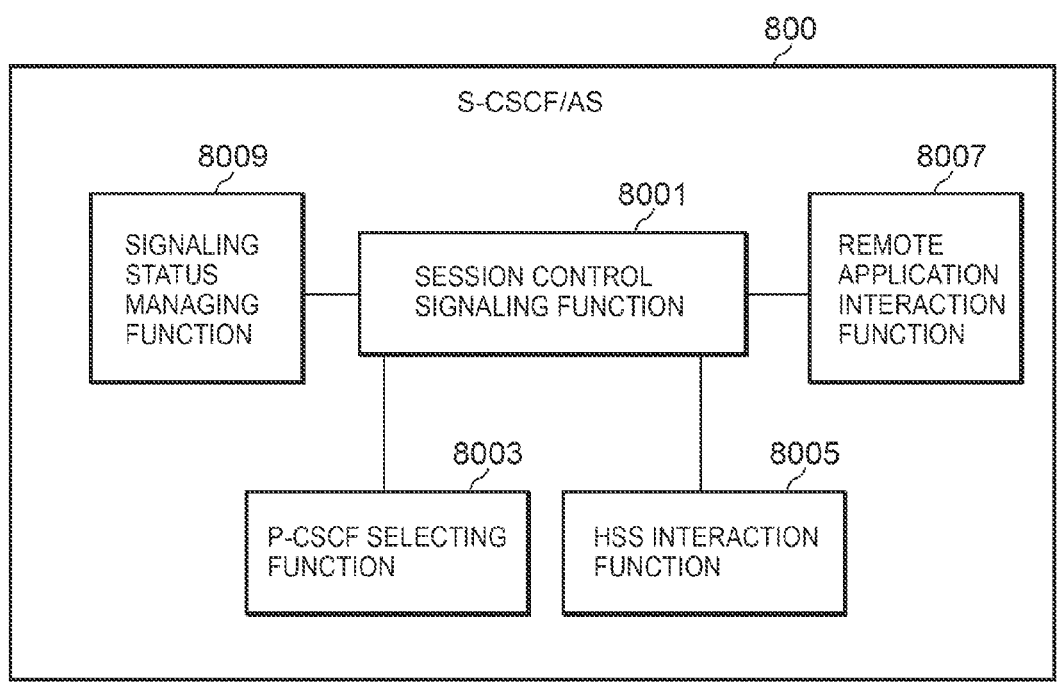
FIG. 8 is a schematical drawing to show an example of arrangement of S-CSCF/AS in the first embodiment of the invention.

In FIG. 8, an example of the arrangement of S-CSCF/AS (corresponding to S-CSCF/AS (125) in FIG. 1) in the embodiment of the invention is shown. As shown in FIG. 8, S-CSCF/AS (800) has five major functions: session control signaling function (8001), P-CSCF selecting function (8003), HSS interaction function (8005), remote application interaction function (8007), and signaling status management function (8009). S-CSCF/AS (800) may be provided with the other functions.

Among the functions of S-CSCF/AS (800), the session control signaling function (8001) is a function to carry out processing of integrated registration as received and session update message (e.g. the IMS_INVITE messages (the IMS_INVITE messages of Steps S3015 and Step S4015), and also performs the processing of the IMS_Register messages (i.e. the IMS_Register messages of Step S5015), and generates the response (e.g. the IMS_Accept message (i.e. the IMS_Accept messages of Steps S3019, S4019 and S5019).

The P-CSCF selecting function (8003) is a function to select the optimal P-CSCF for UE (101) according to the IMS_INVITE messages (i.e. the IMS_INVITE messages in Steps S3015 and S4015), or on local information elements in the IMS_Register messages (i.e. the IMS_Register message of Step S5015) (e.g. local access network information relating to local access network where P-CSCF is disposed) and system level information (e.g. network topology information, information relating to S-CSCF/AS (125) and each P-CSCF). When the optimal P-CSCF is selected for UE (101), mutual communication may be performed with the other nodes (e.g. HSS (Home Subscriber Server)) by the P-CSCF selecting function (8003).

The HSS interaction function (8005) is a function to carry out communication with regard to the registration of UE or a function to perform communication with HSS for acquiring any arbitrary information relating to service control. The remote application interaction function (8007) is a function to carry out the processing to update remote end of communication session. In this processing, processing is performed to transmit a signaling message to an end node (e.g. CN) in communication session. The signaling status management function (8009) is a function to control status information of signaling relating to session of UE (101). For instance, information relating to P-CSCF as selected for UE (101) at a new location is included in this status information.

Figure 9:
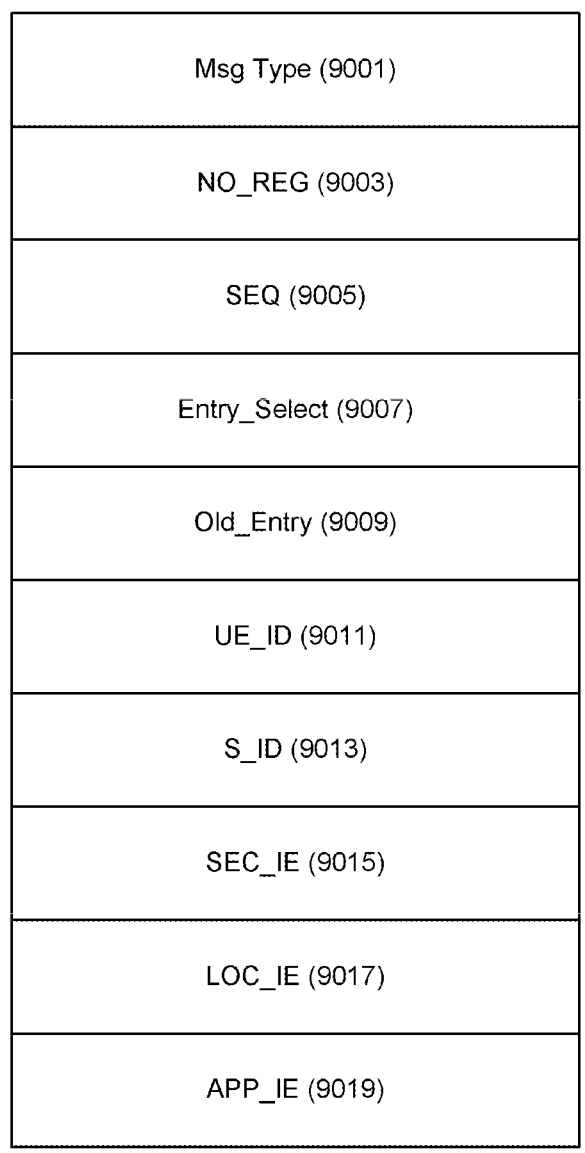
FIG. 9 is a table to show an example of details of an IMS_INVITE message in the first embodiment of the invention.

In FIG. 9, an example of the details of the IMS_INVITE message in the first embodiment of the invention is shown. As shown in FIG. 9, in addition to the elements relating to the INVITE message as defined in the Non-Patent Document 3, the IMS_INVITE message has the elements as given below:

Msg Type (9001): A type value to indicate that this message is an IMS_INVITE message.

No_Reg (9003): A flag to indicate that the IMS_INVITE message is first transmitted without registration by P-CSCF.

SEQ (9005): A special sequence to be used for the matching of the responses at UE (101).

Entry_Select (9007): A flag to indicate that UE (101) recognizes a system to select P-CSCF, which is different from the present P-CSCF (e.g. P-CSCF 2 (123)).

Old_Entry (9009): Information element relating to P-CSCF before the handover (e.g. address and port number are included).

UE_ID (9011): Identification information of the user registered at P-CSCF before the handover.

S_ID (9013): Identification information of instance or session of the user at UE (100).

SEC_IE (9015): Information element so that P-CSCF before the handover can authenticate the message, and that new registration can be carried out.

LOC_IE (9017): Local information elements, which UE (101) uses for updating of IP multimedia session (e.g. new parameter set relating to the media).

APP_IE (9019): Application session information element including application control parameters relating to the session update. This part of the message can be encrypted by using security association between UE (101) and P-CSCF 1 (121).

In FIG. 10, an example of the details, which are present in the IMS_Accept message is shown.

As it is shown in FIG. 10, in addition to the elements relating to the response message as defined in the Non-Patent Document 3, the IMS_Accept message has the elements as given below:

Msg. Type (10001): A type value to indicate that this message is an IMS_Accept message.

COMBINE (10003): A flag to indicate that this message is a response to both of session update and registration update.

SEQ (10005): A special sequence value to be copied from the IMS_INVITE message in order that UE (101) carries out the matching of the responses with the request.

S-CSCF_ID (10007): Information elements including address and identification information of S-CSCF/AS (125).

REG_RESULT (10009): A result code in registration update processing.

UP_RESULT (10011): A result code in session update processing.

Entry_ID (10013): Identification information elements of P-CSCF to indicate P-CSCF as selected by S-CSCF/AS (125) in relation to the continuity of the session.

SEC_IE (10015): Security vector, by which the selected P-CSCF establishes security association with UE (101).

SDP_IE (10017): SDP object to describe session control parameter.

Figure 11:
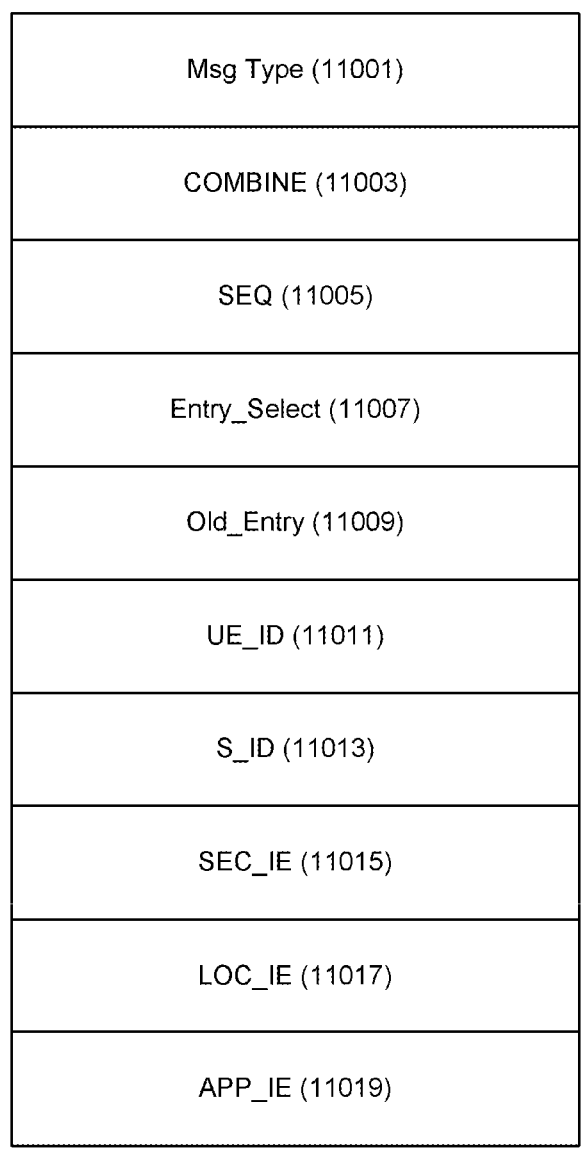
FIG. 11 is a table to show an example of details of an IMS_Register message in the first embodiment of the invention.

FIG. 11 shows an example of the details relating to the IMS_Register message. As shown in FIG. 11, in addition to the elements relating to the Register message as defined in the Non-Patent Document 3, the IMS_Register message has the elements as given below:

Msg Type (11001): A type value to indicate that this message is an IMS_Register message.

COMBINE (11003): A flag to indicate that registration processing is incorporated in session update processing.

SEQ (11005): A special sequence value to be used for the matching of responses at UE (101).

Entry_Select (11007): A flag to indicate that UE (101) recognizes a system to select a P-CSCF, which is different from the present P-CSCF (e.g. P-CSCF 2 (123)).

Old_Entry (11009): Information element relating to the P-CSCF before the handover (e.g. address, port number, etc. are included).

UE_ID (11011): Identification information of the user, which UE (100) has registered on P-CSCF before the handover.

S_ID (11013): Identification information of instance or session of the user at UE (100).

SEC_IE (11015): Information element, by which P-CSCF before the handover can authenticate the message and information to be used for carrying out new registration.

LOC_IE (11017): Local information element, which UE (101) can use to update IP multimedia session (e.g. new parameter set relating to the media).

APP_IE (11019): Application session information element including application session control parameter relating to session update. This part of the message can be encrypted by using security association between UE (101) and P-CSCF 1 (121).

In FIG. 9 to FIG. 11, message format of each of the IMS_INVITE messages, the IMS_Accept message, and the IMS_Register message is shown, while each of these messages is not limited to the format of each of the messages. For instance, when a message is accomplished by using SIP (Session Initiation Protocol), each information element is represented in text format.

In the first embodiment of the invention as described above, the messages transmitted from UE (101) (i.e. the IMS_INVITE messages in Step S3009 and in Step S4009, or the IMS_Register message in Step S5009) are transferred to P-CSCF before the handover (i.e. P-CSCF 1 (121)) via P-CSCF after the handover (i.e. P-CSCF 2 (123)), while the messages may be directly (i.e. not via P-CSCF 2 (123)) to P-CSCF before the handover (i.e. P-CSCF 1 (121)). In this case, UE (101) may acquire the information to be added, which P-CSCF (i.e. P-CSCF 2 (123)) adds in advance and UE (101) may add this to the message to be transmitted to P-CSCF before the handover (i.e. P-CSCF 1 (121)), or P-CSCF 1 (121)), or P-CSCF before the handover (i.e. P-CSCF 1 (121)) may acquire necessary information from P-CSCF after the handover (i.e. P-CSCF 2 (123)) or other node.

As described above, according to the first embodiment of the invention, the application session is updated by using the setup of signaling for UE (100) before the handover. As a result, the handover of the user terminal in the data communication network can be properly controlled, and the number of signaling can be decreased.

The Second Embodiment

Next, description will be given on a second embodiment of the invention.

FIG. 12 shows an example of operation in the second embodiment of the invention. As shown in Step S12001, UE (100) is connected at first to SGW 1 (115), and IP multimedia service session is established via P-CSCF 1 (121) and S-CSCF/AS (125).

Under this condition, P-GW (119) stores information relating to the session of UE (100) (e.g. address of P-CSCF 1 (121)). P-GW (119) can acquire the information relating to the session of UE (100) by various methods. For instance, P-GW (119) may eavesdrop the signaling message between UE (100) and P-CSCF 1 (121). Also, P-GW (119) may manage the allotment of P-CSCF to UE (100) by the means such as DNS, DHCP, bearer setup, etc. Or, P-GW (119) may check the information by S-CSCF/AS (125) or by a back-end server such as home subscriber server.

When UE (100) moves to a new location (i.e. UE (100) in Step S12003), UE (101) tries to attach to SGW 2 (117) as shown in Step S12005. In the attachment processing in Step S12005, various types of processing are carried out, depending on the related access network. For instance, link-layer establishing processing, authentication processing, default bearer setup processing, etc. are carried out.

By the attachment of UE (101), the processing of a network-based mobility management system (e.g. PMIP or GTP) by SGW 2 (117) is initiated. As shown in FIG. 12, in Step 12007, SGW 2 (117) transmits a PBU (Proxy Binding Update) message as described in the Non-Patent Document 1. In case a different type of the network-based mobility management system is adopted, it would be obvious to those skilled in the art that SGW 2 (117) transmits different messages, but this does not give influence on the basic concept of the present invention.

After receiving the PBU message transmitted in Step S12007, P-GW (119) reads out the information relating to the session of UE (100) as stored. Then, as shown in Step S12009, P-GW (119) checks whether the new P-CSCF should be assigned to UE (101), which has moved to a new location. By making inquiry to an arbitrary back-end server (e.g. DHCP server, DNS server, or HSS), P-GW (119) may judge whether the assignment of the new P-CSCF should be carried out or not.

When P-GW (119) judges that it is necessary to change P-CSCF relating to UE (101) (e.g. P-CSCF 2 (123)), P-GW (119) transmits a Context_Trigger message to P-CSCF before the handover (e.g. P-CSCF 1 (121)). The Context_Trigger message as transmitted in Step S12011 has the following information, for instance:

Address of P-CSCF before the handover.

Address of P-CSCF corresponding to the condition after the handover.

Identification information of UE.

Address of UE.

P-GW (119) transmits the Context_Trigger message in Step S12011 by using session information stored relating to UE (100) (e.g. address of P-CSCF 1 (121)). When the Context_Trigger message is successfully transmitted in Step S12011, P-GW (119) updates the session information to be stored in relating to UE (101) by using the address of P-CSCF 2 (123).

It would be obvious to those skilled in the art that P-GW (119) may transmit the Context_Trigger message in Step S12011 by any arbitrary transfer method between P-GW (119) and P-CSCF 1 (121) (e.g. IP in general sense, SIP message, additional control channel as established in advance, etc.). This transfer method does not exert influence on the basic concept of the present invention.

After receiving the Context_Trigger message in Step S12011, P-CSCF 1 (121) reads out session context of UE (100) and transfers it to the new P-CSCF (e.g. P-CSCF 2 (123)) as shown by the Context_Trigger message in Step S12013. In the session context information, the types of information to be stored in P-CSCF after registration processing as described in the Non-Patent Document 2 are included.

After receiving the Context_Trigger message in Step S12013, P-CSCF 2 (123) carries out a third party registration on UE (101) and updates S-CSCF/AS (125) in relation to the new P-CSCF address as shown in the transmission of the Register message in Step S12015. In the Register message in Step S12015, security information necessary for carrying out this update (e.g. update of access network information, re-generation of keys relating to session signaling between UE (101) and P-CSCF 2 (123), etc.) may be included.

As shown in Step S12017, the result of the update processing or necessary feedback (e.g. keying materials) are sent back to P-CSCF 2 (123) by a response message. By using this information, P-CSCF 2 (123) carries out updating of session context for subsequent communication to and from UE (101).

For instance, access network identifying control or filter may be sent back to P-CSCF (123) by the response message of Step S12017.

On the other hand, after the Context_Trigger message has been transmitted in Step S12011, a response to PBU message is given to SGW 2 (117) as shown in Step S12019. The format of the PBA message to be transmitted in Step S12019 is the same as the format described in the Non-Patent Document 1.

Further, in addition to the information element on the PBA message defined in the Non-Patent Document 1, P-GW (119) adds information element relating to a new P-CSCF as assigned to UE (101). This information may be an IP address or in form of FQDN (Fully Qualified Domain Name).

After receiving the PBA message transmitted in Step S12019, SGW 1 (117) makes arrangement for UE (101) by using information included in this PBA message and gives notification by a Configure message. This Configure message may be in form of Router Advertisement message, DHCP message, bearer setup response message, etc. The Configure message transmitted in Step S12021 makes up address information (e.g. prefix of IP address, default router address, etc.), by which UE (101) can continue the session at a new location.

SGW 2 (117) can introduce a new P-CSCF address of UE (101) as acquired from the PBA message in Step S12019 to the Configure message transmitted in Step S12021. Further, in case a new P-CSCF address is not included in the Configure message in Step S12021, a flag is introduced, which indicates that the context is prepared is introduced. By this flag, it is notified to UE (101) that there is no need to carry out the registration.

After receiving the Configure message in Step S12021, UE (101) carries out update of address arrangement. When UE (101) finds out a flag, which indicates that address and context of a new P-CSCF are prepared in the configure message transmitted in Step S12021, UE (101) directly transmits a session signaling message to a new P-CSCF (e.g. P-CSCF 2 (123)). Specifically, in Step S12023, UE (101) transmits an IMS_INVITE message to the address of P-CSCF 2 (123) as acquired from the Configure message in Step S12021. If security can be maintained to and from P-CSCF 1 (121) before the handover, UE (101) may adopt the same security system (such as re-generation key) when necessary.

The IMS_INVITE message transmitted in Step S12023 is acquired from the Context_Transfer message in Step S12013, and it is intercepted at P-CSCF 2 (123) by using session context information updated from S-CSCF/AS (125) via a Response message in Step S12017. After P-CSCF 2 (123) carries out necessary updating according to this IMS_INVITE message, the IMS_INVITE message is transmitted to S-CSCF/AS (125) as shown in Step S12025.

After the processings of the signaling message and the session update have been carried out according to the IMS_INVITE message, S-CSCF/AS (125) gives an IMS_Accept message as a response to P-CSCF 2 (123) as shown in Step S12027. After carrying out necessary processing (e.g. deletion of information relating to any arbitrary network such as charging rule), P-CSCF 2 (123) transfers an IMS_Accept message to UE (101).

As described above, in the second embodiment of the invention, application session is updated by using the setup of signaling relating to UE (100) before the handover. This makes it possible to properly control the handover of the user terminal in the data communication network and to decrease the number of signalings.

According to the second embodiment of the present invention, a handover control system as given below is provided:

A handover control system for signaling control when a user terminal carries out a handover from a first access network to a second access network, wherein said handover control system has:

a first entry point of control signaling protocol corresponding to said first access network;

a second entry point of control signaling protocol corresponding to said second access network; and a communication node capable to perform communication to and from each of said first entry point and said second entry point; and wherein, in case said user terminal carries out said handover from said first access network to said second access network and when address of said user terminal is not changed, said second entry point notifies the connection of said user terminal to said communication node;

said communication node notifies identification information of said user terminal and address of said second entry point to said first entry point where the setup of signaling relating to said user terminal as set before said handover is maintained, and also notifies address of said second entry point to said user terminal;

said first entry point transfers information relating to setup of signaling for said user terminal as set before said handover to said second entry point;

said user terminal transmits said session update signaling message for carrying update of application session to said second entry point; and the information on the setup of signaling for said user terminal as set before said handover is re-used by said second entry point for the setup of signaling for said user terminal after said handover; and wherein the update of said application session is accordingly carried out by using the setup of signal for said user terminal as set up before said handover.

It would be obvious to those skilled in the art that operations of the embodiments as described in the present specification can be changed and modified so far as such change or modification does not exert influence on the basic concept of the present invention. For instance, in the second embodiment of the invention, P-GW (119) may not introduce a new P-CSCF address to a PBA message transmitted in Step S12019 and DHCP query or DNS query relating to P-CSCF from UE may be relayed to P-GW (119). Also, in this response, P-GW (119) may introduce a flag to indicate that an address of a new P-CSCF (e.g. P-CSCF 2 (123)) and registration processing are not needed.

Although only one P-GW (119) is shown in FIG. 1, it would be obvious to those skilled in the art that, if the address of UE (101) is maintained after the moving, the present invention can be applied even when a different P-GW (i.e. a P-GW different from the P-GW in charge of management of UE (100)) carries out management on UE (101) after the handover. Further, it would also be obvious to those skilled in the art that eNB as shown in FIG. 1 may be a home node B or eNB/CSG (Closed Subscriber Group). So far as necessary information relating to the signaling as proposed in the invention is available to UE (101), it would be obvious to those skilled in the art that UE (100) and UE (101) as shown in FIG. 1 may be physical entities different from each other.

Each of the functional blocks as described in the embodiments of the invention as described above can be accomplished as a Large Scale Integration (LSI), which is typically represented by an integrated circuit. These may be produced individually as one chip, or it may be produced as one chip, which contains a part or all. Here, it is referred as LSI, while it may be referred as Integrated Circuit (IC), system LSI, super LSI, or ultra LSI, depending on the difference in the degree of integration.

Also, the technique of circuit integration is not limited to LSI, but it may be realized as a dedicated circuit or a general-purpose processor. Or, after the manufacture of LSI, FPGA (Field Programmable Gate Array), which can be programmed as the manufacture of LSI, or a reconfigurable processor may used, in which LSI can be reconfigured.

Further, with the advancement of semiconductor technique or other type of technology derived from it, if a new technique of circuit integration may emerge and replace LSI, functional blocks may be integrated by using such technique. For instance, adaption to biotechnology is one of such possibilities.

INDUSTRIAL APPLICABILITY

The present invention gives such advantages that a handover by a user terminal in data communication network can be adequately controlled and the number of signalings can be decreased. The invention is also applicable to the technique of data communication network, and, in particular, to the technology of signaling control relating to a terminal in a mobile data communication system.

The invention claimed is:

1. A method of updating an IP multimedia subsystem (IMS) session comprising:
when a user terminal performs a handover from a first access network to a second access network, wherein an address of the user terminal is not changed, and an entity supporting signaling of the IMS session is changed from a first Proxy Call Session Control Function (P-CSCF) to a second P-CSCF:
the second P-CSCF receives an IMS session update message including a flag indicating that registration of a new IMS session is not made and an information element relating to the first P-CSCF from the user terminal, updates the IMS session update message, and transmits the IMS session update message to the first P-CSCF, the first P-CSCF and the second P-CSCF being entities supporting signaling of the IMS session;
the first P-CSCF receives the IMS session update message from the second P-CSCF, and transmits the IMS session update message to a Serving Call Session Control Function (S-CSCF); and
the S-CSCF receives the IMS session update message from the first P-CSCF, and updates the IMS session based on the IMS session update message using signaling of a setup of said user terminal, wherein the setup is performed before said handover.

2. The method according to claim 1, wherein the updating the IMS session update message by the second P-CSCF includes adding address information of the second P-CSCF.

3. The method according to claim 1, wherein the updating the IMS session by the S-CSCF includes updating address information of the second P-CSCF.

4. A system of updating an IP multimedia subsystem (IMS) session comprising:
a user terminal;
a first Proxy Call Session Control Function (P-CSCF) and a second P-CSCF, the first and second P-CSCFs being entities supporting signaling of the IMS session; and
a Serving Call Session Control Function (S-CSCF),
wherein, when a user terminal performs a handover from a first access network to a second access network, wherein an address of the user terminal is not changed, and an entity supporting signaling of the IMS session is changed from a first Proxy Call Session Control Function (P-CSCF) to a second P-CSCF:
- the second P-CSCF is configured to receive an IMS session update message including a flag indicating that registration of a new IMS session is not made and an information element relating to the first P-CSCF form the user terminal, to update the IMS session update message, and to transmit the IMS session update message to the first P-CSCF, the second P-CSCF being an entity supporting signaling of the IMS session;
- the first P-CSCF is configured to receive the IMS session update message from the second P-CSCF, and to transmit the IMS session update message to the S-CSCF; and
- the S-CSCF configured to receive the IMS session update message from the first P-CSCF, and to update the IMS session based on the IMS session update message using signaling of a setup of said user terminal, wherein the setup is performed before said handover.

5. The system according to claim 4, wherein the updating the IMS session update message by the second P-CSCF includes adding address information of the second P-CSCF.

6. The system according to claim 4, wherein the updating the IMS session by the S-CSCF includes updating address information of the second P-CSCF.

* * * * *